United States Patent [19]

Rasmussen et al.

[11] Patent Number: 4,696,161
[45] Date of Patent: Sep. 29, 1987

[54] CONTROL DEVICE FOR HYDROSTATIC STEERING MEANS

[75] Inventors: Ivar Rasmussen, Sonderborg; Poul H. H. Pedersen, Nordborg, both of Denmark

[73] Assignee: Danfoss A/S, Nordborg, Denmark

[21] Appl. No.: 835,570

[22] Filed: Mar. 3, 1986

[30] Foreign Application Priority Data

Mar. 6, 1985 [DE] Fed. Rep. of Germany ....... 3507901

[51] Int. Cl.$^4$ .......................... F16D 31/02; F01C 1/02
[52] U.S. Cl. .................................... 60/384; 418/61 B; 137/625.21
[58] Field of Search ................ 418/61 B; 60/483, 385, 60/387, 384; 137/625.21

[56] References Cited

U.S. PATENT DOCUMENTS 3,452,543  7/1969  Goff et al. .............................. 60/384
4,533,303  8/1985  Petersen et al. .................. 418/61 B
4,620,416  11/1986 Yip et al. ............................... 60/384

Primary Examiner—William E. Wayner
Attorney, Agent, or Firm—Wayne B. Easton

[57] ABSTRACT

The invention relates to a hydrostatic power steering unit of the type having a gerotor gear set forming a metering motor and a valve unit for routing pressurized fluid from an inlet port selectively via expansible chambers of the gerotor gear set to either one of two motor ports while connecting the other one of the motor ports to an outlet port. The housing of the valve unit, which has inner and outer rotary sleeve members, is arranged adjacent the gerotor gear set. A cardan shaft connects the outer sleeve member to the gerotor star member, a gear head connected to the adjacent end of the outer sleeve is disposed internally of the inner sleeve member. Supply and drain ports and motor ports connectable to an external servomotor are provided in a cover plate which is fastened to the gerotor gear set on the side thereof opposite from the valve unit. Some of the axial bores in the gerotor ring gear normally used as bolt holes are used as passages for connecting the supply port and the motor ports to the interior of the valve unit on the other side of the gerotor.

8 Claims, 5 Drawing Figures

CONTROL DEVICE FOR HYDROSTATIC STEERING MEANS

The invention relates to a control device for hydrostatic steering means, of which the housing comprises an internally toothed gear ring of a measuring motor between a valve block and an end plate and is held together by screws passing through axial bores in the gear ring, wherein the valve block comprises abore which, to define a directional and distributing valve arrangement, receives an outer pressure valve and an inner rotary valve connectable to the steering shaft as well as a cardan shaft which is connected to rotate with the outer rotary valve and to a rotating and planetating gear of the measuring motor and, in extension of axial bores in the gear ring, comprises at least three axial passages which are connected to the bore of the valve block, the axial bores being at least partially disposed in the teeth of the gear ring, and wherein a first motor connection is connected to the first axial passage, a second motor connection to the second axial passage, a pump connection to the third axial passage and a tank connection to the interior of the bore and gear receiving the steering wheel.

In a known control device of this kind, (DE-PS No. 27 02 692), the connections for the pump, motor and tank are at the circumference of the valve block. All axial passages are closed by the fastening screws at the end of the valve block. Since the axial bores of the gear ring through which the screws pass are at least partially disposed in the teeth of the gear ring, the external diameter can be kept small.

In another known control device (U.S. Pat. No. 3,452,543), the valve block merely contains one axially displaceable rotary valve sleeve and a second plate-like rotary valve is disposed between the measuring motor and end plate. In addition to the set of four connections at the circumferential surface, a second set of four connections is provided at the end plate. Each of the four connections is disposed between two adjacent fastening screws. To accommodate the multiplicity of required bores, they have to be entirely disposed beyond the teeth of the gear ring, so that the housing dimensions become correspondingly larger.

The invention is based on the problem of providing a control device of the aforementioned kind which, while largely retaining the construction, dimensions, machining operations and components, is provided with end connections.

This problem is solved according to the invention in that the end plate centrally carries the tank connection which communicates with the interior of the gear and, in axial extension of the three axial passages, carries the pump connection and the two motor connections which are connected to the axial passages by way of the associated axial bores in the gear ring.

In this construction, part of the axial bores in the teeth of the gear ring is used as a connecting channel between the axial passages and the associated connections. The central tank connection opens directly into the interior. The measuring motor, the rotary valves, the cardan shaft and practically all machining operations for the valve block can remain unchanged.

It is particularly favourable, if the housing carries a second set of pump, operating and tank connections at its circumferential wall. In such a device, the user can choose later which of the connections he wants to use. Also, one and the same valve block may be used for both applications.

A control device in which a fourth axial passage is connected to a control pressure connection can be constructed so that the end carries the control pressure connection in axial extension of the fourth axial passage. This will therefore likewise be disposed at the end of the appliance.

The circumferential wall of the housing can in this case carry a second control pressure connection adjacent to the fourth axial passage and connected thereto by a transverse bore. The control pressure conduit can then also be connected for operation wherever it happens to be most convenient.

It is of considerable advantage for at least one of the screws to have a passage, be introduced through one of the connections and be supported by its head against a shoulder at the base of the connecting bore. In this way one obtains an adequate clamping force even at elevated pressures, although the end of the control device is provided with connections.

It is also favourable if, to increase the spacing of adjacent connections, the axis of at least one connecting bore is offset from that of the associated axial passage. This permits convenient assembly of the fittings at the end connections even for small control devices.

If the third axial passage is also connected to the tank connection by a check valve and an abutment for a valve ball is inserted in the end of this axial passage facing the measuring motor, it is advisable for the abutment to comprise a connecting passage between the axial bore and axial passage. In this way, one can make the connection between axial passage and connection despite the presence of the abutment.

In particular, the abutment can be completely screwed into the valve block and the connecting passage may be formed by a blind hole in the end plate open towards the pump connection and radial bores extending from the blind hole. Only this abutment need then be specially manufactured.

It is also favourable for the cardan shaft to comprise a connecting passage which leads from the middle of that end face of a toothed head of the cardan shaft which confronts the tank connection to the cardan shaft circumference on the other side of the head. In this way, one ensures that the interior communicates with the tank connection without a disruptive throttling point.

In particular, the connecting passage may have at least one oblique bore. This gives a particularly simple construction.

If an apertured disc is provided between the gear and end plate, the aperture should have a diameter such that more than half of its cross-section permanently overlaps the mouth of the tank connection facing the interior. This also contributes to avoiding throttling between the interior and the tank connection.

A preferred example of the invention will now be described in more detail with reference to the drawing, in which.

Figure 1:
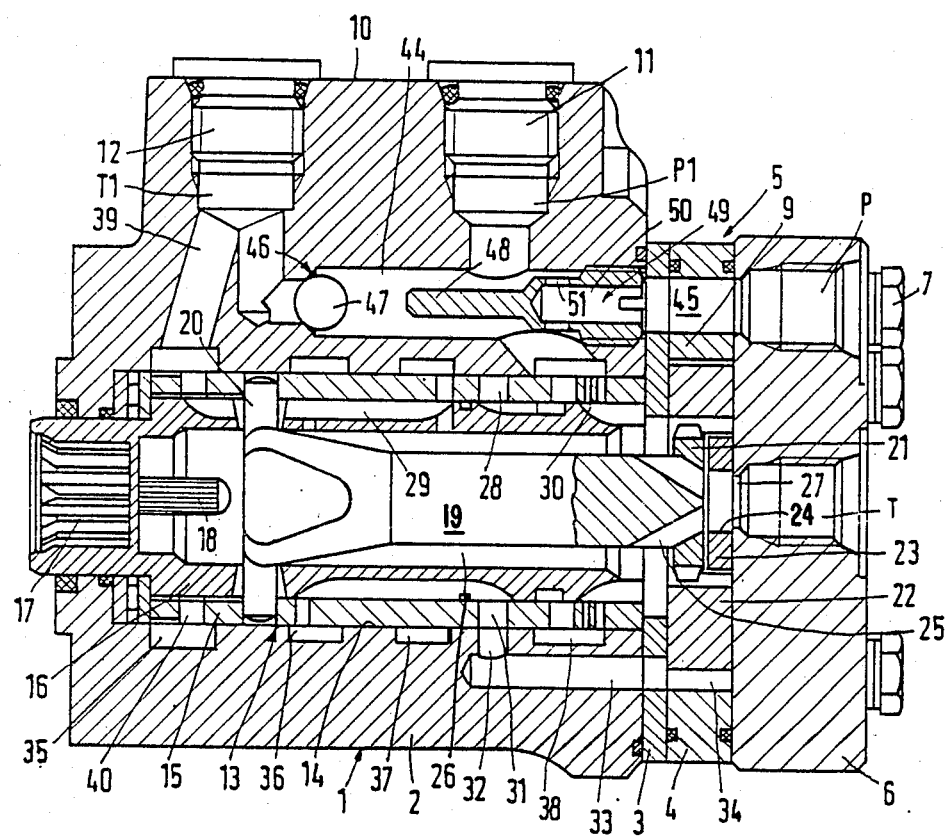
FIG. 1 is a longitudinal section on Line I—I in FIG. 2 of a control device according to the invention.

The illustrated control device comprises a housing 1 with a valve block 2, intermediate plate 3, internally toothed gear ring 4 of a measuring motor 5, and end plate 6. These parts are held together by screws 7 which engage through axial bores in each of the teeth 9 of gear ring 4.

A pump connection P and two motor connections R and L are provided on a circle at the free end of end plate 6. A tank connection T is arranged centrally. A second set of these connections is located at the top 10 of the valve block 2. FIG. 1 shows a pump connection P1 and a tank connection T1, these being sealed by closure members 11 and 12.

Valve block 2, valve arrangement 13 therein and measuring motor 5 are substantially of conventional construction. A bore 14 in valve block 2 receives an outer rotary valve 15 and the latter an inner rotary valve 16 which can be connected by a coupling 17 to rotate with a cardan shaft. Both rotary valves are held in a neutral position relatively to each other by leaf springs 18. In the interior there is a cardan shaft 19 which is coupled by a pin 20 to turn with the outer rotary slide 15 and, at the other end, is coupled by a toothed head 21 to turn with an externally toothed gear 22 of the measuring motor. A spacer disc 23 with central hole 24 holds the cardan shaft 19 in the correct axial position.

Connecting passages 25 in the form of oblique holes lead from the centre of the end of the cardan shaft head 21 to the circumference of the cardan shaft on the opposite side of the head. In this way, the interior 26 of bore 14 and gear 22 receiving the cardan shaft 19 is connected with little resistance to the tank connection T. The hole 24 should be so large that in every operating position at least half the cross-section of the mouth 27 of tank connection T overlaps the hole 24.

The outer rotary valve 15 and inner rotary valve 16 contain numerous control orifices 28 and longitudinal grooves 29 which together define a directional valve with the aid of which the measuring motor 5 and the motor connected to the connections R and L are adjustable in both operating directions. In the zone 30 there are neutral position orifices through which pressure fluid can reach the tank connection directly in the neutral position. Control orifices 31 in the outer rotary valve 15 and control orifices 32 in the bore 14 define a distributing valve which leads to the compression chambers 34 of the measuring motor 5 by way of axial passages 33, so that they are functionally correctly connected to the pump side and the respective one motor connection.

Figure 3:
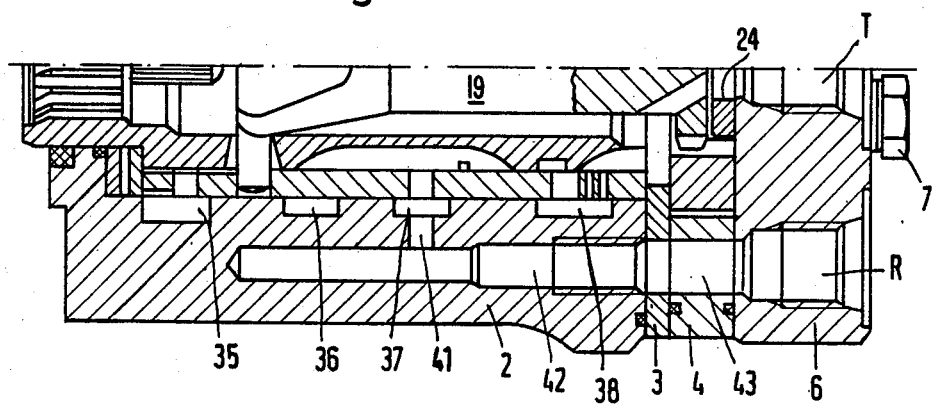
FIG. 3 is a section on line III—III in FIG. 2.

The bore 14 has four annular grooves 35, 36, 37 and 38. The annular groove 35 communicates with the tank connection T1 by way of a bore 39 and, by way of apertures 40 in the rotary valves, with the interior 26 and thus with the tank connection T. The two annular grooves 36 and 37 are each connected to a motor connection L or R as is shown in FIG. 3 for the annular groove 37. The latter communicates by way of a radial bore 41 with an axial passage 42 which, by way of an axial bore 43 in a tooth 9 of the gear ring 4 with the motor connection R.

A further axial passage 44 in valve block 1 communicates on the one side with the pump connection P1 and on the other side by way of an axial bore 45 with the pump connection P. A check valve 46 between pump connection P1 and tank connection T1 comprises a ball 47 of which movement is limited by an abutment 48. The abutment is fully screwed into the axial passage 44.

It has a connecting passage 49 consisting of an axial blind hole 50 and radial bores 51.

Figure 2:
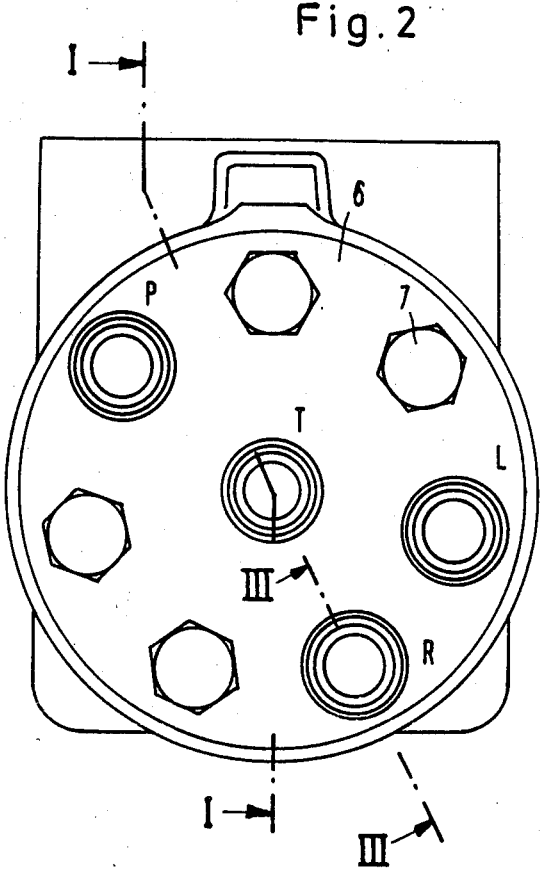
FIG. 2 is an end elevation from the left of FIG. 1.

As clearly shown in FIG. 2, the screws 7 and connections P, L and R are arranged at substantially equal pitch on a circle. This follows because the axial bores 43, 45 which pass through each tooth 9 of gear ring 4 are likewise equally spaced from one another. The two motor connections L and R, however, have a somewhat larger spacing from each other than the normal pitch of the screws 7 so that the usual fittings and accessories can be conveniently assembled. The axes of the connecting bores are therefore circumferentially offset from those of the associated axial passages. The gear ring can be built in different angular positions because the through holes for screws 7 and the axial bores for the connections are identical. The fact that not all axial bores are occupied by screws is usually immaterial. One embodiment as illustrated could be operated up to 100 bar without the occurrence of impermissable leakage values.

Figure 4:
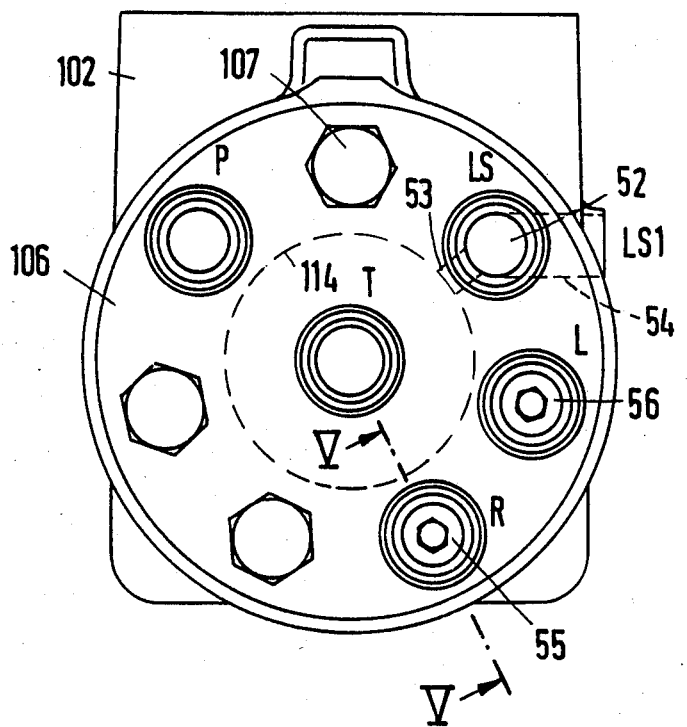
FIG. 4 is an end elevation corresponding to FIG. 2 of a modified control device.
Figure 5:
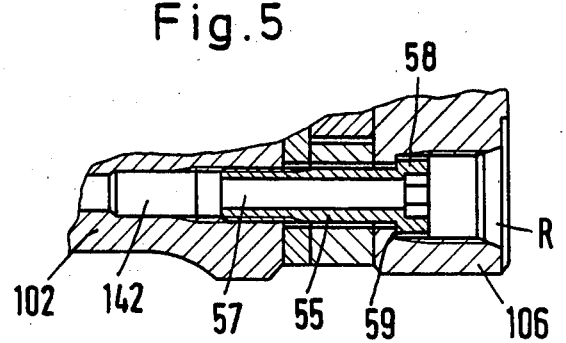
FIG. 5 is a part section on line V—V in FIG. 4.

In the embodiment of FIGS. 4 and 5, corresponding parts are given reference numerals increased by 100 with respect to FIGS. 1 to 3. The end cover 106 carries a control pressure connection LS in extension of a fourth axial passage 52. This axial passage 52 is connected by way of a radial bore 53 to the bore 114 of valve block 102 at a position where one can in known manner derive a load-dependent control pressure at a circumferential groove of the outer rotary valve. Next to this fourth axial passage 52 in the side wall of valve block 102 there is a second control pressure connection LS1 which is connected to the axial passage 52 by a transverse hole 54.

Additional screws 55 and 56 are disposed in the motor connections R and L. They have a through passage 57, are introduced through the connection and are supported by their head 58 against a shoulder 59 at the base of the connecting bore. Such additional screws can be used when, because of the number of end connections, the remaining original screws are not enough at the given operating pressures.

It depends on the internal construction of the valve block as to where the end connections PLS, L and R are located. For example, the valve block could also be constructed so that the connections L and LS are exchanged.

We claim:

1. A hydrostatic power steering unit, comprising, an outer internally toothed ring gear, an inner externally toothed gear being in orbital and rotational engagement therewith, said gears forming compression chambers therebetween upon relative movement between said gears, an end plate on one side of said ring gear in juxtaposition thereto, a valve unit on the other side of said ring gear having a housing in juxtaposition thereto, said cover plate having at the outer surface thereof a fluid inlet pump connection and a fluid outlet drain connection and a pair of motor connections, said housing having a bore which is coaxial relative to said ring gear, valve means including inner and outer sleeve members rotatably mounted in said bore, said sleeve members having a rotational movement therebetween for changing valve settings therebetween to selectively generate directional control pressures in said pair of motor connections, said valve means including cooperating fluid passage means in said housing and said sleeve members and being operable to connect said fluid inlet pump connection selectively to either of said motor connections while connecting the other of said motor connections to said fluid outlet drain connection, said inner sleeve member having coupling means for connection to a steering control member, said externally toothed gear having a central bore, a cardan shaft and coupling means connecting one end thereof to said outer sleeve member for rotation therewith and the other end thereof to said externally toothed gear for rotational and orbital movement therewith, said ring gear having axially extending bores extending through the teeth thereof, screws for attaching said end plate to said ring gear and said valve housing extending through some of said ring gear bores, said fluid passage means including one of said ring gear bores for providing fluid communication between said fluid supply pump connection and said valve means, and said fluid passage means including two of said ring gear bores for providing fluid communication between said pair of motor connections and said pump and drain connections.

2. A hydrostatic power steering unit according to claim 1 characterized in that said housing has at the circumference thereof a second set of pump and drain connections having respective fluid communication with said first named pump and drain connections in said end plate.

3. A hydrostatic power steering unit according to claim 1 including a control pressure connection in said end plate and a fourth one of said ring gear bores having a fluid connection with said control port to provide fluid communication between said control pressure connection and the interior of said valve housing.

4. A hydrostatic power steering unit according to claim 3 including a second control pressure connection in the circumferential wall of said valve housing and fluid passage means connecting said fourth one of said ring gear bores to said second control pressure connection.

5. A hydrostatic power steering unit according to claim 1 including screw means extending into one of said connections and into one of said ring gear bores axially aligned therewith, said screw means having a central bore therein providing fluid flow therethrough.

6. A hydrostatic power steering unit according to claim 2 including a bypass passage in said valve housing between said second set of fluid pump and drain connections and in axial alignment with said supply pump connection in said end plate, check valve means and an abutment therefor in said axially extending passage, said abutment being mounted adjacent the corresponding one of said ring gear bores and having a central passage to provide fluid communication between said pump connection in said end plate and said bypass passage.

7. A hydrostatic power steering unit according to claim 1 wherein said drain connection is located centrally of said end plate, and said cardan shaft having at its end connected to said inner externally toothed gear passage means providing an enhanced fluid connection between said drain connection and the interior of said valve housing.

8. A hydrostatic power steering unit according to claim 7 including an apertured spacer disc between said cardan shaft and said end plate.

* * * * *